(12) United States Patent
Koschany

(10) Patent No.: US 6,376,110 B1
(45) Date of Patent: Apr. 23, 2002

(54) METHOD FOR REGULATING MEMBRANE MOISTURE OF A POLYMER ELECTROLYTE FUEL CELL, AND A POLYMER ELECTROLYTE FUEL CELL

(75) Inventor: Arthur Koschany, Pöcking (DE)

(73) Assignee: Magnet-Motor Gesellschaft für magnetmotorische Technik mbH, Starnberg (DE)

( * ) Notice: Subject to any disclaimer, the term of this patent is extended or adjusted under 35 U.S.C. 154(b) by 0 days.

(21) Appl. No.: 09/402,661

(22) PCT Filed: Apr. 10, 1997

(86) PCT No.: PCT/EP97/01793

§ 371 Date: Mar. 3, 2000

§ 102(e) Date: Mar. 3, 2000

(87) PCT Pub. No.: WO98/45890

PCT Pub. Date: Oct. 15, 1998

(51) Int. Cl.[7] .............................. H01M 8/04; H01M 8/10
(52) U.S. Cl. ............................ 429/13; 429/22; 429/32
(58) Field of Search .............................. 429/13, 22, 30, 429/32, 33

(56) References Cited

U.S. PATENT DOCUMENTS

| | | | |
|---|---|---|---|
| 5,468,574 A | 11/1995 | Ehrenberg et al. | ............. 429/33 |
| 6,117,577 A | * 9/2000 | Wilson | ..................... 429/30 X |

FOREIGN PATENT DOCUMENTS

| | | |
|---|---|---|
| DE | 25 33 215 | 12/1979 |
| DE | 42 01 632 | 7/1993 |
| DE | 19641143 | 4/1997 |
| DE | 19648995 | 4/1997 |
| EP | 0 316 626 | 5/1989 |
| EP | 0 743 693 | 11/1996 |
| JP | 01-031353 | 2/1989 |
| JP | 07-282832 | 10/1995 |

OTHER PUBLICATIONS

Springer et al, "Polymer Electrolyte Fuel Cell Model", *J. Electrechem. Soc.*, vol. 138, No. 8, Aug. 1991, pp. 2332–2342.

Flint et al, "Investigation of radiation–grafted PVDF–g–polystyrene–sulfonic–acid ion exchange membranes for use in hydrogen oxygen fuel cells", *Solid State Ionics* 97 (1997), pp. 299–307. (month unknown).

Nguyen et al, "A Water and Heat Management Model for Proton–Exhange–Membrane Fuel Cells", *J. Electrochem. Soc.*, vol. 140, No. 8, Aug. 1993, pp. 2178–2186.

Zawodzinski et al, "A Comparative Study of Water Uptake By and Transport Through Ionomeric Fuel Cell Membranes" *J. Electrochem. Soc.*, vol. 140, No. 7, Jul. 1993, pp. 1981–1985.

Zawodzinski et al, "Water Uptake by and Transport Through Nafion 117 Membranes", *J. Electrochem. Soc.*, vol. 140, No. 4, Apr. 1993, pp 1041–1047.

Zahreddine et al, "The conductivity of the novel PTFE Polymer electrolytes", 6030 *Solid State Ionics* 58 (1992) Nov. No. 1 /2, pp. 185–187.

(List continued on next page.)

Primary Examiner—Stephen Kalafut
(74) Attorney, Agent, or Firm—Venable; Robert Kinberg; Ashley J. Wells

(57) ABSTRACT

Fuel cell stack and method of regulating membrane moisture of polymer electrolyte membranes of fuel cells of the fuel cell stack includes ascertaining electronically an average value of an electrical value corresponding to moisture of the polymer electrolyte membranes of a number of fuel cells of the fuel cell stack without utilization of an auxiliary electrode, the number of fuel cells ranging from two fuel cells to all fuel cells of the fuel cell stack; and adjusting the moisture of the polymer electrolyte membranes of the number of fuel cells to an optimum moisture as a function of the average value ascertained.

12 Claims, 4 Drawing Sheets

OTHER PUBLICATIONS

Rota et al, "In–situ Membrane Resistance Measurements in PEFC as an Indication of Inhomogeneous Water Distribution in the Membrane", 1046b *Extended Abstracts*, Spring Meeting (1995) May 21/26, p, 718.

Bernardi, "Water–Balance Calculations for Solid–Polymer–Electrolyte Fuel Cells", *J. Electrochem. Soc.*, vol. 137, No. 11, Nov. 1990, pp. 3344–3350.

* cited by examiner

METHOD FOR REGULATING MEMBRANE MOISTURE OF A POLYMER ELECTROLYTE FUEL CELL, AND A POLYMER ELECTROLYTE FUEL CELL

BACKGROUND OF THE INVENTION

1. Field of the Invention

The invention relates to a method of regulating the membrane moisture of a polymer electrolyte fuel cell, and to a polymer electrolyte fuel cell comprising a means for regulating the membrane moisture. The fuel cells contain solid polymer membranes as electrolyte and preferably use hydrogen as burnable gas and air or oxygen under low pressure as oxidizing agent.

2. Description of the Related Art

Polymer electrolyte membrane fuel cells, as they are commonly employed for producing electric current, contain an anode, a cathode and an ion exchange membrane disposed therebetween. A plurality of fuel cells constitutes a fuel cell stack, with the individual fuel cells being separated from each other by bipolar plates acting as current collectors. For generating electricity, a burnable gas, e.g. hydrogen, is introduced into the anode region, and an oxidizing agent, e.g. air or oxygen, is introduced into the cathode region. Anode and cathode, in the regions in contact with the polymer electrolyte membrane, each contain a catalyst layer. In the anode catalyst layer, the fuel is oxidized thereby forming cations and free electrons, and in the cathode catalyst layer, the oxidizing agent is reduced by taking up electrons. The cations migrate through the ion exchange membrane to the cathode and react with the reduced oxidizing agent, thereby forming water when hydrogen is used as burnable gas and oxygen is used as oxidizing agent. In the reaction of burnable gas and oxidizing agent, there are released considerable amounts of heat that must be dissipated by cooling. Cooling so far has been achieved by cooling channels in the bipolar plates through which deionized water is flown.

With this kind of cooling, tremendous material problems result since there are typically about 50 to 300 bipolar plates connected in series, with the cooling water thus electrically joining together different potentials. The result thereof are material decompositions. In accordance therewith, solely graphite or gold-plated metal are feasible as material for the bipolar plates.

Furthermore, it is necessary to keep the polymer membrane moist, since the conductivity value of the membrane is greatly dependent on its water content. To prevent drying up of the membrane, there was thus required a complex system for humidifying the reaction gases.

It is the object of the invention to make available a polymer electrolyte fuel cell and a polymer electrolyte fuel cell stack, respectively, in which the polymer electrolyte membrane of a fuel cell has the optimum moisture content at all times during operation.

An additional object of the invention consists in making available a method which renders possible to keep the polymer electrolyte membrane of a polymer electrolyte fuel cell at an optimum moisture content during operation of the fuel cell.

SUMMARY OF THE INVENTION

The object is met by the method of regulating the membrane moisture of a polymer electrolyte fuel cell according to claim 1, the polymer electrolyte fuel cell according to claim 7 and the fuel cell stack of a plurality of polymer electrolyte fuel cells according to claim 12.

Preferred developments of the invention are indicated in the dependent claims.

Polymer electrolyte membranes require a high water content to ensure optimum conductivity for $H^+$ ions. The water content must be maintained as a rule by supply of water, as otherwise the burnable gas flows and oxidizing agent gas flows flowing through the cell dry up the membrane. However, to counteract possible drying up by the addition of an excess of water, is not sensible since water in too large quantities results in flooding of the electrodes, i.e. the pores of the electrodes are clogged. Simple ascertaining and regulating the particular amount of water required has not been possible so far.

DESCRIPTION OF THE PREFERRED EMBODIMENTS

A polymer electrolyte fuel cell according to the invention uses air or oxygen at slight overpressure as oxidizing agent. Preferred is an overpressure of less than 2 bar, with an overpressure of less than 0.5 bar being particularly preferred. The necessary pressure difference can also be obtained by suction. As burnable gas, preferably hydrogen is used, but the use of other burnable gases is in principle possible was well. As polymer electrolyte membrane, preferably NAFION® is employed, hydrogen is supplied to the individual fuel cells of a stack and distributed via gas channels in the anode region. Air is supplied at the same time and distributed via gas channels in the cathode region. The hydrogen migrates to the anode catalyst layer and forms cations there which migrate through the electrolyte, a proton exchange membrane, to the cathode. At the cathode, oxygen migrates to the cathode catalyst layer and is reduced there. During the reaction with the cations, water is created as reaction product. Due to the reaction heat, the water formed evaporates, which results in a certain cooling effect. This cooling effect, however, is not sufficient on the one hand, and on the other hand the membrane in the course of operation of the fuel cell is increasingly depleted of humidity.

Figure 3:
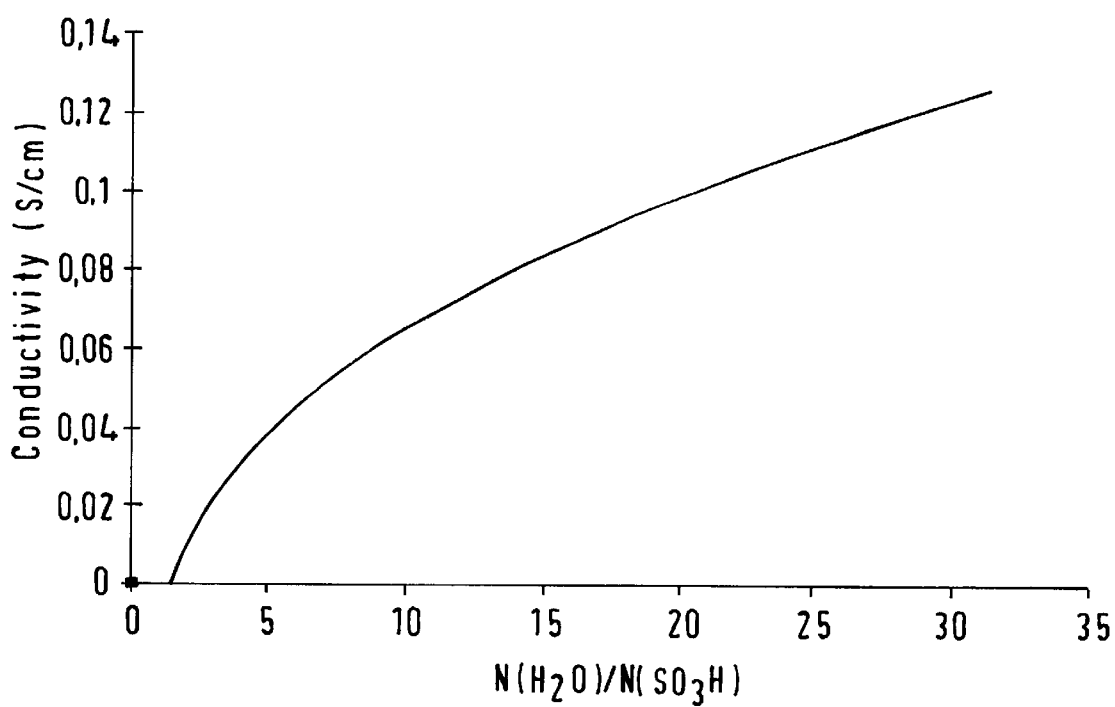
FIG. 3 shows the dependency of the conductivity a NAFION® membrane on the water content of a membrane.

As can be seen from FIG. 3 for NAFION® NE 105 (30° C.), the conductivity of ion-conducting membranes increases with the $H_2O$ content. $N(H_2O)/N(SO_3H)$ designates the number of water molecules per sulphonic acid remainder of the membrane.

A reduction of the moisture content of the solid polymer electrolyte membrane of a fuel cell thus has the consequence that its internal resistance increases, i.e. that its conductivity value decreases. The conductivity value of the membrane is dependent in extreme manner on its water content. What is essential for efficient operation of a polymer electrolyte fuel cell is thus that the polymer electrolyte membrane at all times have the optimum humidity corresponding to the particular operating conditions (temperature, load, air ratio).

For maintaining optimum humidity, it is possible according to the invention to determine during operation of the fuel cell, preferably regularly or continuously, whether the membrane is moist in optimum manner or whether measures for adjusting the optimum membrane moisture need to be taken.

Adjusting the optimum membrane moisture can take place, for example, by adding the required amount of water in the liquid or gaseous state. Preferably, the water is added to one of the reaction gases or both reaction gases. Additional possibilities of keeping the membrane at an optimum moisture content consist in matching the operating conditions to the moisture content ascertained. The operating conditions mainly conceivable in this respect are the electrode temperatures, the volume flows of the reaction gases and the load of the fuel cell. According to the invention, setting the optimum membrane moisture thus takes place as follows: after ascertaining to what extent the actual moisture differs from the desired moisture, a specific amount of water is added or the temperature of at least one of the electrodes or the volume flow of burnable gas and/or oxidizing agent is altered in such a manner that the actual moisture of the membrane corresponds to the optimum membrane moisture at said changed operating conditions. Changing of the load is possible as well to achieve in essence conformity between the optimum membrane moisture and the actual membrane moisture. According to the invention, it is also possible to combine several ones of the above-mentioned measures in order to effect setting of the optimum membrane moisture.

In the following, the invention will be elucidated by way of regulating the water addition.

The amount of water added basically can vary very much. It is dependent on the particular operating conditions of the fuel cell, and it is dependent in particular also on the type of cooling of the fuel cell. Frequently, fuel cells are fed with water for cooling which, depending on the construction of the fuel cells, humidifies to a certain extent also the membrane. As a rule, less additional water has to be supplied then than in case of cells employing exclusively air cooling, for example.

The conductivity value of the membrane depends on the water content thereof. During operation of a fuel cell, however, the conductivity value of the membrane cannot be measured directly. According to the invention, a measure of the membrane moisture, preferably the impedance of the fuel cell (value of the impedance or particularly preferred, the real part of the impedance) is ascertained. Since the conductivity value of the membrane is a continual, monotonic function of these quantities, the necessary amount of water can also be regulated on the basis of the impedance.

Figure 2:
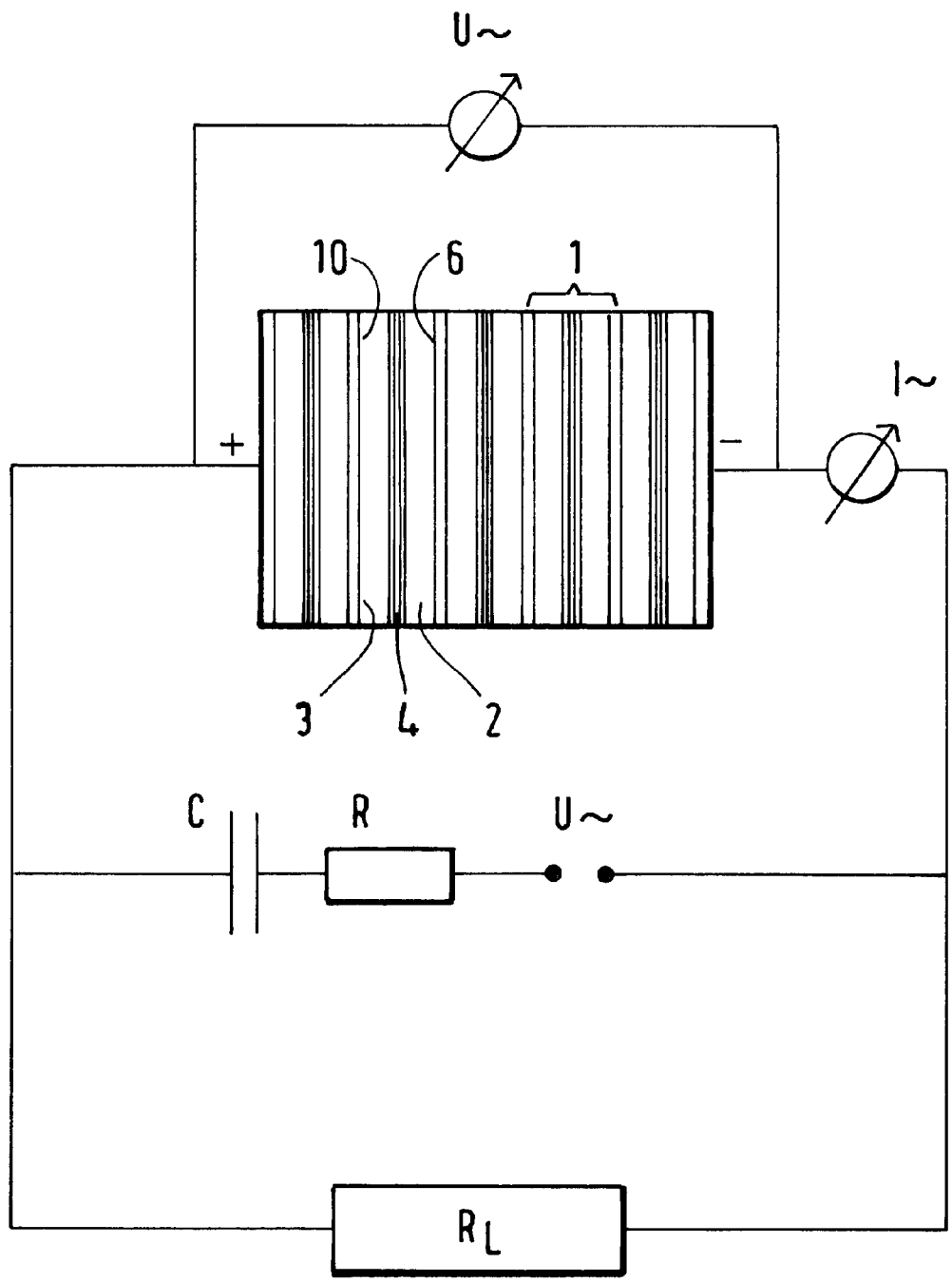
FIG. 2 shows a circuit for measuring the impedance of fuel cells.

A possible circuit for measuring the impedance of a fuel cell is shown in FIG. 2. As shown in FIG. 2, the fuel cells 1 comprise an anode region 3, a cathode region 2, a polymer electrolyte membrane 4 disposed there between, and bipolar plates 10, 6 at the anode side and at the cathode side, respectively. The anode-side bipolar plate simultaneously is the cathode-side bipolar plate of a neighboring cell. The anode and cathode regions are designed as different layers carrying a suitable catalyst (without reference numeral) adjacent to the membrane.

The determination of the measure of the membrane moisture according to the invention does not necessitate auxiliary electrodes, i.e. it makes use of the operating electrodes. Intervention or interference with the cell proper is not necessary.

Direct measurement of the conductivity value and thus of the moisture content of a polymer electrolyte membrane of a fuel cell by determination of the impedance is carried out by modulation of the cell voltage with an alternating signal having a frequency of 1 to 20 kHz. In case of a fuel cell stack, suitably the average moisture content of several membranes is measured. The quotient of alternating voltage and the resulting current response is a measure for the moisture. In FIG. 2, BZ represents the fuel cell and $R_L$ represents the load resistor. Connected in parallel to the load resistor is an assembly of capacitor C, resistor R and alternating voltage source U, which is suitable to produce small alternating voltages (in the order of magnitude of about 10 mV) and large currents (in the order of magnitude of about 10 A). The voltage of the fuel cell is modulated by the alternating signal (about 1 to 20 kHz). The alternating voltage component U effects an alternating current I to be superimposed on the fuel cell current. The quotient of alternating voltage and alternating current is a measure for the impedance of the fuel cell and thus a measure for the moisture of the polymer electrolyte membrane and for the necessary amount of water to be added, respectively.

However, the amount or value of the impedance is dependent, in addition to the conductivity of the membrane, on further determinative quantities, namely on the size of the catalyst surface in contact with the membrane, the ohmic resistance of the electrodes and the poisoning of the membrane by foreign ions. These quantities are subject to a certain amount of change in the course of the service life of a fuel cell, with the deviations due to change of the ohmic resistance of the electrodes and due to poisoning of the membrane by foreign ions being as a rule negligible. In the course of the life of a fuel cell, the value of the impedance which corresponds to the optimum membrane moisture under the given operating conditions (desired or set value of the amount of the impedance), can thus vary. Thus, the desired value to be observed of the amount of the impedance should be set each time anew in the course of arising maintenance work. In doing so, the new desired value is determined by maximizing the performance of the fuel cell. During operation of the fuel cell, the optimum desired value can be matched anew in alternative manner by Fuzzy logic or other methods familiar to the expert, in accordance with the changed conditions.

A measure for the conductivity of the membrane that is largely independent of the catalyst surface (whose change in essence is responsible for the change of the desired value of the impedance) is obtained if, in addition to the amount of the impedance, its phase angle is considered as well. If the real part of the impedance determined electronically therefrom is regarded as regulating variable, one sole desired value can be employed even over the entire service life of the fuel cell.

During operation of the fuel cells, the impedance (amount or real part) can be measured continuously or at regular intervals. In case a too low conductivity value of the membrane or membranes is calculated on the basis of the measurement, water is supplied to the system, for example by electronically controlled opening of water inlet valves, as is usual, until the desired value of the impedance is reached again, or one or more of the operating conditions are varied in corresponding manner.

In case of fuel cell stacks with a plurality of fuel cells, it is favorable not to determine the amount or the real part of the impedance for each membrane individually, but to determine average values for a plurality of cells of the stack or even for all cells of the stack jointly and to arrange the necessary addition of water in accordance therewith.

Figure 4A:
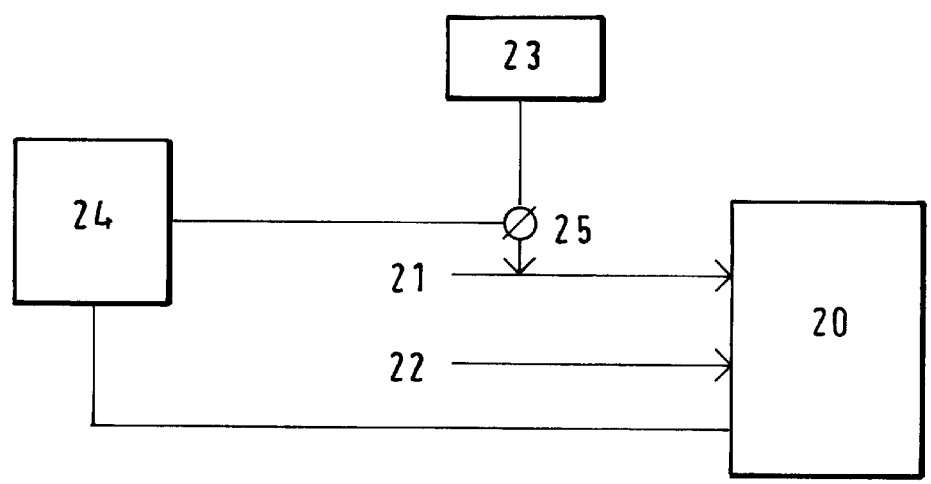
FIG. 4a shows a schematic representation of the control of water addition.

FIG. 4a schematically illustrates a specific example of controlling the introduction of membrane humidifying water into a fuel cell stack 20 operated with hydrogen 21 and air 22. In case too low membrane moisture is measured, water from water supply tank 23 is fed via valve 25 into the hydrogen flow 21 until the required membrane moisture is reached. opening and closing of valve 25 is effected by control apparatus 24.

Figure 4B:
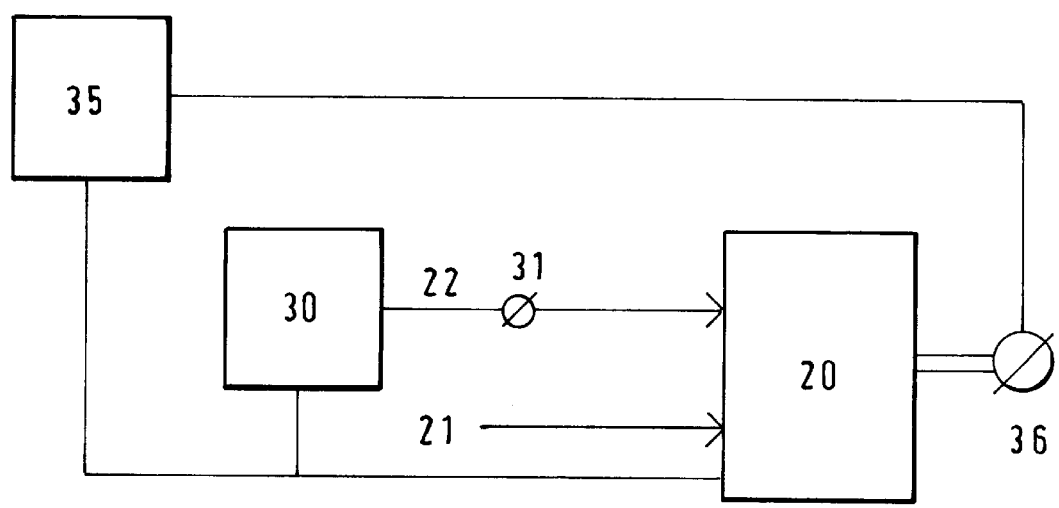
FIG. 4b shows a schematic representation of controlling a change of the operating conditions.

FIG. 4b schematically illustrates a specific example of controlling the change, of operating conditions (air volume flow and load) in a fuel cell stack 20 operated with hydrogen 21 and air 22. In case a membrane humidity value is measured that is not optimum, control apparatus 30 controls, as required, increased opening or closing of valve 31 until the necessary air volume flow has been obtained. As an alternative, it is also possible to change the hydrogen volume flow 21 or both flows. In particular with air-cooled fuel cells, control of the temperature is possible as well via control of the air flow 22. Another alternative results by an air-flow independent variation of the temperature of the fuel cell (e.g. in case of water-cooling), which also effects a variation in moisture content of the membrane. Another possibility consists in controlling the load 36 by means of the control apparatus 35.

Irrespective of the manner of determination of the optimum water content of the membrane and the regulation of the water introduction, it is possible according to the invention to use membrane humidifying water simultaneously for cooling the fuel cell and for thus ensuring sufficient cooling. This is achieved according to the invention in that in case of a fuel cell designed as outlined hereinbefore, ion-free water in liquid form is introduced directly into the gas channels for the combustion air. As an alternative, the water can also be introduced directly into the gas channels for the burnable gas.

A proven solution is the introduction of water both in the cathode region and in the anode region, particularly with operating conditions causing severe drying up of the membrane.

The liquid water evaporates in the hot fuel cell and effects efficient cooling of the cell due to the phase conversion taking place. Furthermore, it penetrates into the polymer electrolyte membrane and keeps it moist.

The easiest possibility of adding the necessary amount of water to the air flow and to the air and/or hydrogen flow, respectively, consists in introducing the water into the gas channels by means of a metering pump, in numerous thin lines, e.g. capillaries. In doing so, no substantial mixing of the water with the air and the burnable gas, respectively, takes place, so that the free water surface available for evaporation is relatively small.

A considerably larger free water surface and thus faster humidifying of the membrane and more efficient cooling is obtained if the required amount of water is added to the reaction gas flows in mixed form, i.e. as aerosol. The water-in-air aerosol and, if applicable, the water-in-burnable gas aerosol contain water in the form of droplets with a size of 2 to 20 $\mu$m, which ensure rapid vaporization or evaporation. The aerosol can be produced for instance with the aid of ultrasonic atomizers or nozzles. The simplest production of the aerosol, which at the same time requires the least amount of energy, takes place by means of ultrasonic atomizers at frequencies of at least 100 kHz.

Figure 1:
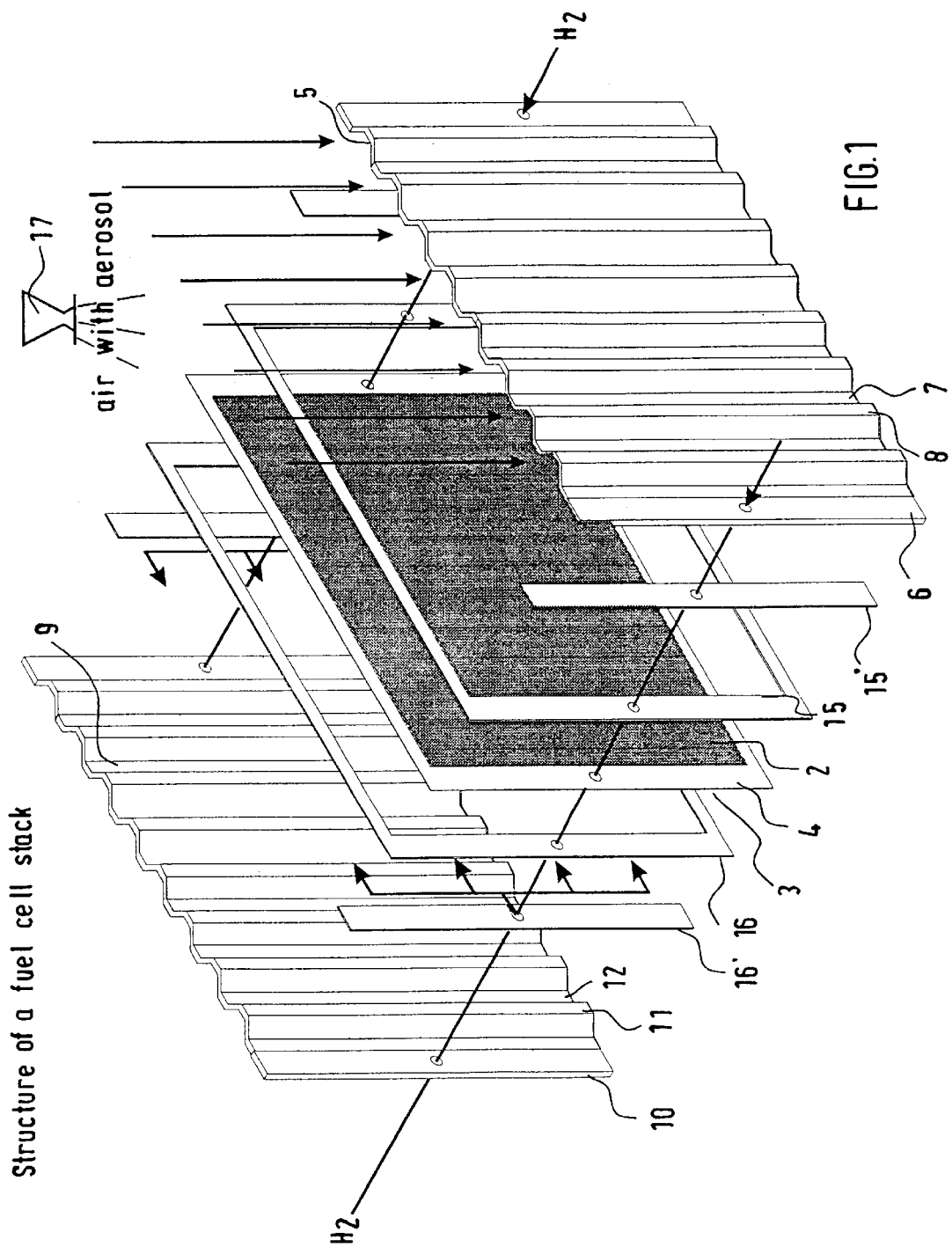
FIG. 1 shows a preferred embodiment of a fuel cell according to the invention.

A particularly advantageous embodiment of the invention consists in designing the passages or channels for receiving the water-in-air aerosol and the water-in-burnable gas aerosol, respectively, as shown in FIG. 1. In a fuel cell stack, each fuel cell is confined on the anode side and on the cathode side by a bipolar plate 10, 6 each. The anode-side bipolar plate simultaneously is the cathode-side bipolar plate of a neighboring cell and the cathode-side bipolar plate at the same time is the anode-side bipolar plate of the other neighboring cell.

The bipolar plate, at least in a partial region, is of corrugated sheet structure, i.e. it has alternating elevations and depressions. A surface of the bipolar plate 6 contacts, with its elevations 7, the cathode region 2 of the fuel cell, whereby the depressions 8 located between two adjacent elevations each together with the cathode region form channels 5 for receiving water-in-air aerosol 17. In corresponding manner, the bipolar plate 10 contacts with one surface the anode region 3 of the cell, so that the depressions 12 located between two adjacent anode-side elevations 11 each also form channels 9 together with the anode region 3. These can serve for taking up water-in-burnable gas aerosol.

In the embodiment shown in FIG. 1, hydrogen as burnable gas is introduced perpendicularly to the plate surface through bores. The hydrogen first enters channel 9 in communication with the supply opening and from there diffuses or flows into the adjacent porous anode region. From there, the hydrogen diffuses in part to the anode catalyst layer and in part into additional gas channels 9 in the plane of the anode region. Because of the outstanding diffusion properties of hydrogen, the entire anode region thus is uniformly supplied with hydrogen without a problem.

If cooling water is to be supplied as well along with the burnable gas, it is as a rule more advantageous to choose the same type of feeding as in the cathode region, i.e. to feed fuel and water into each individual channel 9. Because of the poor diffusion properties of water in comparison with hydrogen, only little water would penetrate the anode otherwise, and the cooling effect would thus be low.

The construction has no separate cooling channels whatsoever. A specific advantage consists in particular in that the path of the aerosol through the channels 5 of the cell constitutes a straight line. The corrugated sheet structure of the bipolar plate with straight gas paths permits to minimize depositions of the aerosol and to conduct the necessary volume flows with low pressure drop.

Flooding and clogging of the water-conducting paths by water droplets, as is frequently the case with porous plates, does not take place. Besides, the "corrugated sheet plate" can be manufactured very inexpensively and simply in terms of manufacturing technology.

The anode and cathode regions are each designed as diffusion layers carrying a suitable catalyst and disposed on the opposite sides of the polymer electrolyte membrane 4.

Air gaskets 15, 15' and hydrogen gaskets 16, 16' seal the cell in gastight manner.

To increase the dwell period of the water in the cell and to thus enable complete evaporation, the walls of the gas channels 5 and/or the gas channels 9 can be coated with a hydrophilic absorbent layer, for instance with felt. The hydrophilic, absorbent layer distributes the introduced amount of water in particularly even manner and retains the same up to evaporation.

The amount of water required for obtaining optimum membrane humidification, as outlined hereinbefore, can be determined and regulated electronically. The amount of water introduced into the fuel cell can fulfill two tasks: cooling the cell and humidifying the membrane. For regulation of the required amount of water, however, only the setting of the suitable membrane moisture is taken into consideration. Depending on the parameters temperature, load, air ratio and the like, the optimum membrane moisture and thus the optimum conductivity value of the membrane is determined experimentally. The addition of water varies depending on the conductivity value to be reached. The cell temperature varies within wide limits depending on the operating conditions. As long as sufficient water is introduced to ensure optimum membrane moisture, a sufficient cooling effect, however, is ensured as well.

For keeping the moisture content of the reaction gases and the temperature thereof along the direction of flow as constant as possible in a fuel cell or fuel cell stack, the reaction gas, in particular the air, may be caused to pass the cell stack several times. This takes place by recirculation of the air/water mixture leaving the fuel cells and the burnable gas/water mixture leaving the fuel cells, respectively, to the respective suction or intake flow.

Thus, it is possible according to the invention in a polymer electrolyte fuel cell, by introducing ion-free water in liquid form directly into the gas channels of the combustion air and/or the burnable gas, to ensure at the same time keeping of an optimum membrane moisture and, thus, an optimum conductivity value of the membrane as well as sufficient cooling of the fuel cell.

What is claimed is:

1. A method of regulating membrane moisture of polymer electrolyte membranes of fuel cells of a fuel cell stack, comprising:

ascertaining electronically an average value of an electrical value corresponding to moisture of the polymer electrolyte membranes of a number of fuel cells of the fuel cell stack without utilization of an auxiliary electrode, the number of fuel cells ranging from two fuel cells to all fuel cells of the fuel cell stack; and adjusting the moisture of the polymer electrolyte membranes of the number of fuel cells to an optimum moisture as a function of the average value ascertained.

2. The method according to claim 1, wherein the average value ascertained electronically is an average of the electrical values corresponding to moisture of the polymer electrolyte membranes of all fuel cells of the fuel cell stack.

3. The method according to claim 1, wherein ascertaining is carried out by modulating voltage of the number of fuel cells with an alternating signal.

4. The method according to claim 3, wherein the electrical value corresponding to moisture of the polymer electrolyte membranes of a number of fuel cells of the fuel cell stack ascertained is impedance.

5. The method according to claim 1, wherein adjusting the moisture of the polymer electrolyte membranes of the number of fuel cells to an optimum moisture is carried out by at least one of (a) introducing water in a required amount, (b) changing electrode temperature, (c) changing gas volume flow of at least reaction gases, and (d) changing load.

6. The method according to claim 1, wherein the polymer electrolyte membranes are humidified and the fuel cells simultaneously cooled by introducing water in liquid form and in a required amount directly into at least one of (a) gas channels for air, and (b) gas channels for burnable gas.

7. A fuel cell stack, comprising:

a plurality of polymer electrolyte fuel cells each having an anode region, a cathode region, and a polymer electrolyte membrane disposed between the anode region and the cathode region;

means for supplying air as oxidizing agent to respective cathode regions;

gas channel means for distributing the air in the respective cathode regions;

means for supplying burnable gas to respective anode regions;

gas channel means for distributing the burnable gas in respective anode regions;

electronic means for ascertaining an average value of an electrical value corresponding to moisture of the polymer electrolyte membranes of a number of fuel cells of the fuel cell stack without utilization of an auxiliary electrode, the number of fuel cells ranging from two fuel cells to all fuel cells of the fuel cell stack; and means for adjusting the moisture of the polymer electrolyte membranes of the number of fuel cells to an optimum moisture as a function of the average value of the ascertained.

8. The fuel cell stack according to claim 7, wherein the electronic means for ascertaining the average value of an electrical value corresponding to moisture of the polymer electrolyte membranes of a number of fuel cells of the fuel cell stack ascertains the average value of all of the fuel cells.

9. The fuel cell stack according to claim 7, wherein the electronic means for ascertaining the average value of an electrical value corresponding to moisture of the polymer electrolyte membranes ascertains the average value by modulating voltage of the number of fuel cells with an alternating signal.

10. The fuel cell stack according to claim 9, wherein the electronic means for ascertaining the average value of an electrical value corresponding to moisture of the polymer electrolyte membranes ascertains impedance of the number of fuel cells.

11. The fuel cell stack according to claim 7, wherein the means for adjusting the moisture of the polymer electrolyte membranes of the number of fuel cells to an optimum moisture as a function of the average value ascertained is carried out by at least one of (a) introducing water in a required amount, (b) changing electrode temperature, (c) changing gas volume flow of at least reaction gases, and (d) changing load.

12. The fuel cell stack according to claim 7, further comprising means for introducing water in liquid form directly into at least one of (a) the gas channels for air in the respective cathode regions and (b) the gas channels for burnable gas in the respective anode regions, and bipolar plates positioned to confine the respective polymer electrolyte fuel cells on at least one of the anode side and the cathode side.

* * * * *

UNITED STATES PATENT AND TRADEMARK OFFICE
CERTIFICATE OF CORRECTION

PATENT NO.    : 6,376,110 B1
DATED         : April 23, 2002
INVENTOR(S)   : Arthur Koschany, Christian Lucas and Thomas Schwesinger It is certified that error appears in the above-identified patent and that said Letters Patent is hereby corrected as shown below:

<u>Title page,</u>
Item [75], should read as follows:
-- [75] Inventors:   Arthur Koschany, Pöcking (DE)
                     Christian Lucas, Martinsried (DE)
                     Thomas Schwesinger, Kirchroth (DE) --

Signed and Sealed this

Third Day of September, 2002

*Attest:*

*Attesting Officer*

JAMES E. ROGAN
*Director of the United States Patent and Trademark Office*